June 23, 1925.  1,543,611
G. W. OLSON
MILLING MACHINE ATTACHMENT
Filed April 14, 1923   4 Sheets-Sheet 3

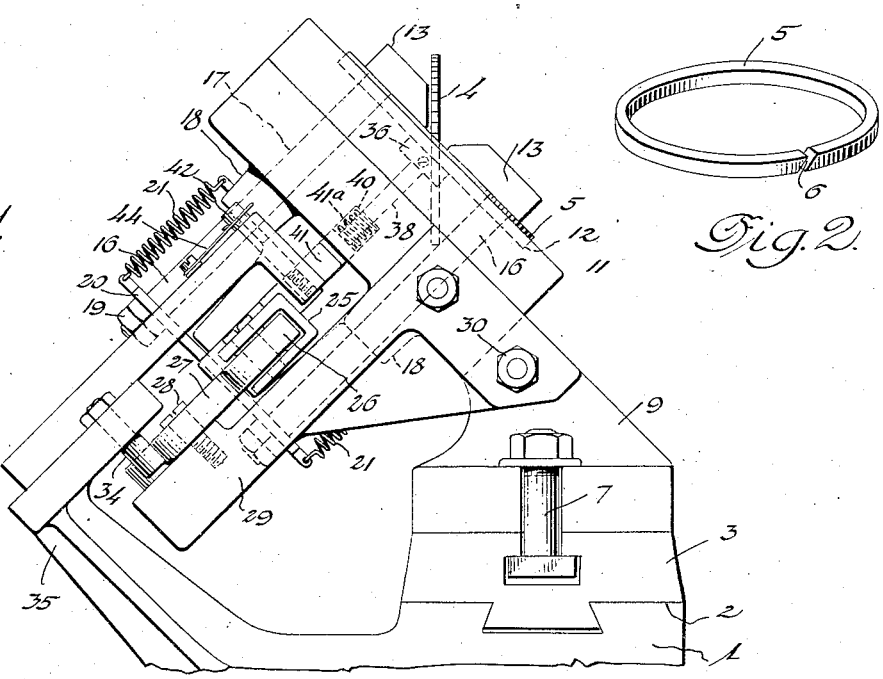

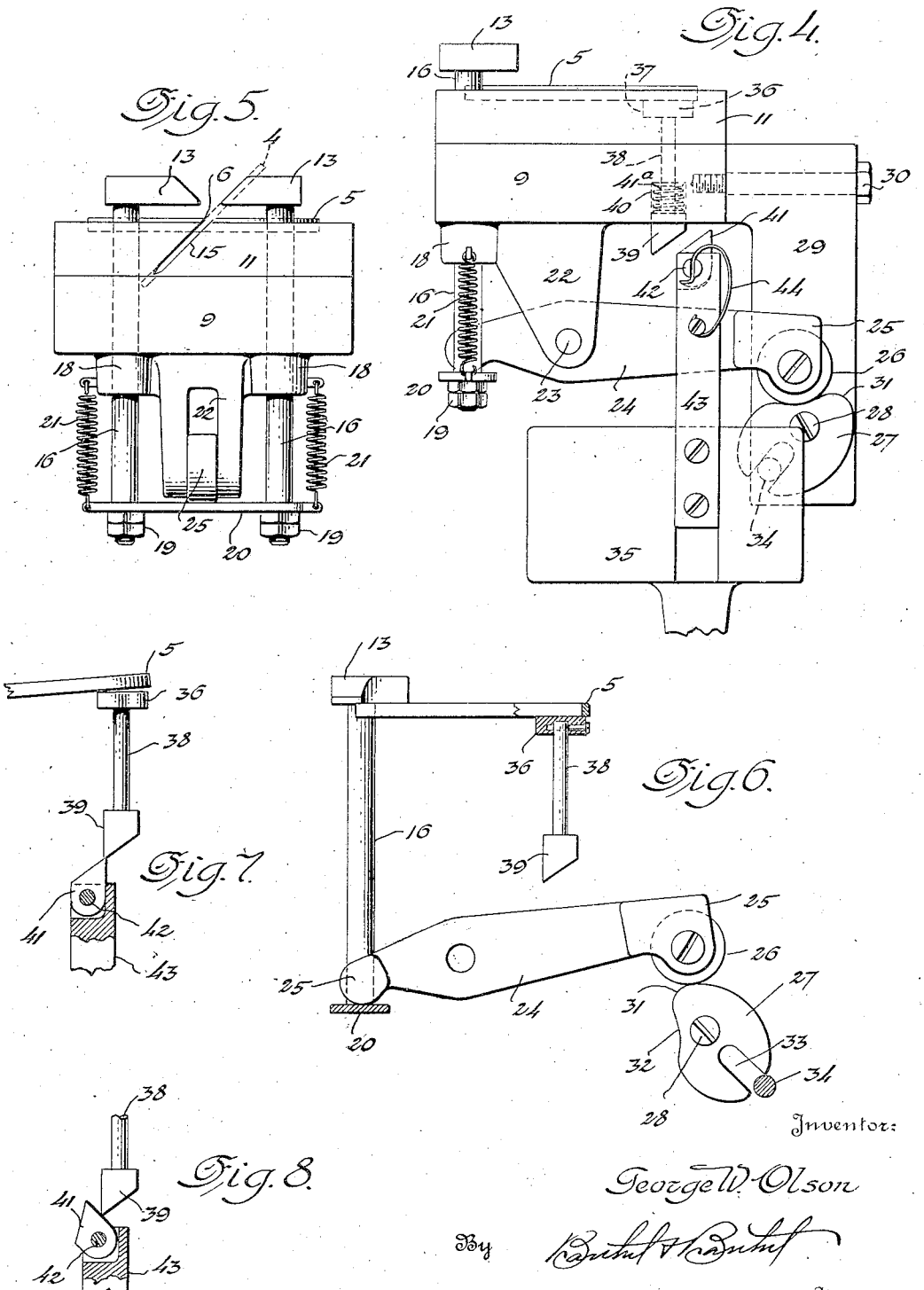

Inventor:
George W. Olson
By Barthel & Barthel
Attorneys

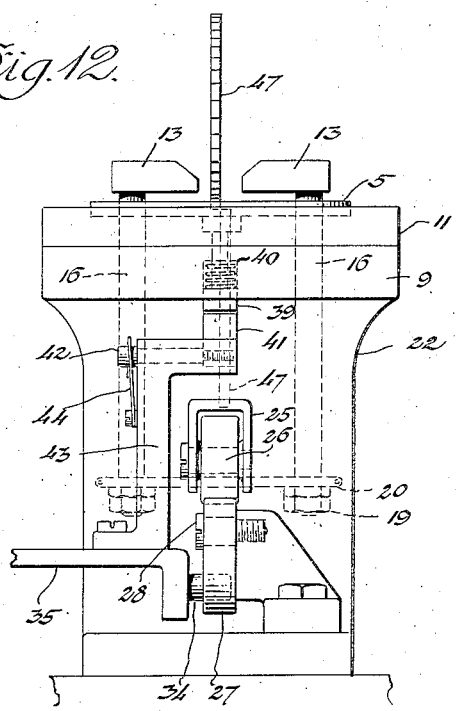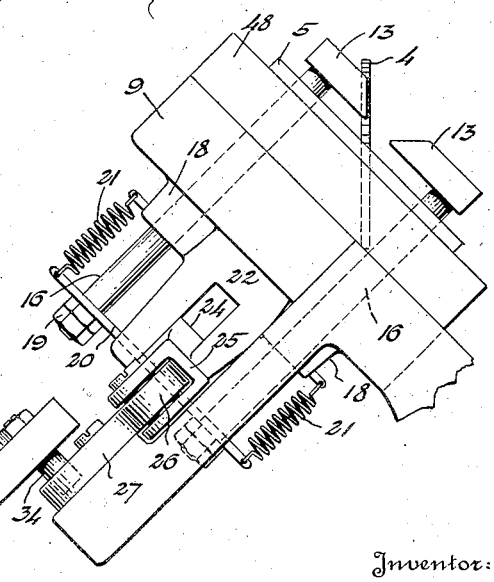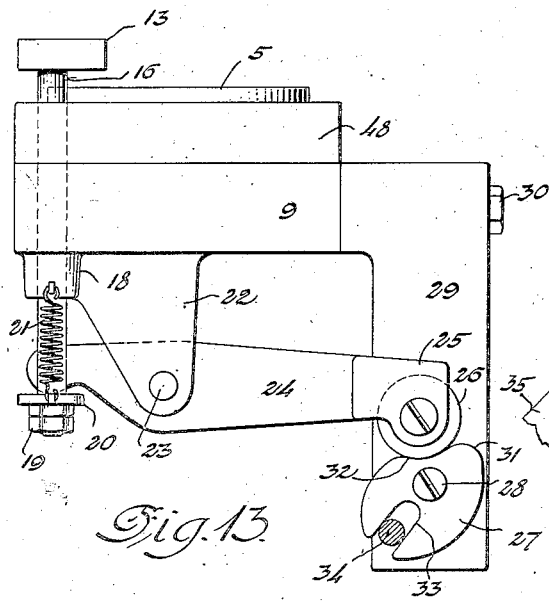

Patented June 23, 1925.

1,543,611

UNITED STATES PATENT OFFICE.

GEORGE W. OLSON, OF MUSKEGON, MICHIGAN.

MILLING-MACHINE ATTACHMENT.

Application filed April 14, 1923. Serial No. 632,006.

*To all whom it may concern:*

Be it known that I, GEORGE W. OLSON, a citizen of the United States of America, residing at Muskegon, in the county of Muskegon and State of Michigan, have invented certain new and useful Improvements in Milling-Machine Attachments, of which the following is a specification, reference being had therein to the accompanying drawings.

In the manufacture of piston rings or split annular members a number of operations take place from the time the rings leave the foundry, uncut, unground and in a rough state until the rings are finished, and such operations may be considered, first, that of snagging or removing the rough peripheral wall surface of the rings to certain limits; second, grinding the sides of the rings so that the rings will be of predetermined thickness; third, rough milling or slotting the rings; fourth, rough turning the rings or operating upon a plurality of the rings in a lathe to turn down the peripheral walls thereof, and fifth, finish milling which is an operation that may be somewhat similar to the third operation of rough milling the rings.

This invention has particular reference to a milling machine attachment by which rough milling or finish milling may be expeditiously and economically carried on. In either of these operations a ring is provided with either an angle slot or stepped slot already cut so as to form a split contractible ring or annular member. To provide a spring with an angle slot my machine attachment is disposed at an acute or obtuse angle relative to the cutting instrumentalities for operating upon the rings, and for a stepped slot or cut the machine attachment is disposed at a right angle to the cutters. The attachment when used for the rough milling operation is devoid of certain features embodied in the attachment when used for a finished milling operation and it is believed only necessary to describe the attachment in its most salutary form embodying automatic jaws or gripping members for holding the ring while being milled, and an automatic ejector for disposing of the ring after the milling operation. The cooperation between the ring clamping jaws and the ejector is timed according to the movement of a reciprocable work holder or table which carries the ring into and out of engagement with the cutters, and the constructive arrangement of my attachment is such that rings may be expeditiously handled, greater accuracy attained and production practically doubled compared to the usual method of producing piston rings.

The construction of the milling machine attachment, by which I attain the above results will be hereinafter described and then claimed, and reference will now be had to the drawings, wherein Figure 1 is a side elevation of a portion of the milling machine provided with an attachment in accordance with this invention;

Fig. 2 is a perspective view of a piston ring provided with an angular cut;

Fig. 3 is a front elevation of the milling machine attachment;

Fig. 4 is a view looking at the rear portion of the attachment;

Fig. 5 is a side elevation of a portion of the attachment showing a portion of that side opposite that shown in Fig. 1;

Fig. 6 is an elevation of parts of the attachment relative to a piston ring, showing the clamping and ejecting mechanisms;

Fig. 7 is a detail view of a ring ejector in one position;

Fig. 8 is a detail of a portion of the ejector mechanism illustrating a tiltable cam member;

Fig. 12 is a front elevation of the same, and

Figs. 13 and 14 are views of the milling machine attachment which differs slightly from that illustrated in Figs. 1 and 3.

Figure 9:
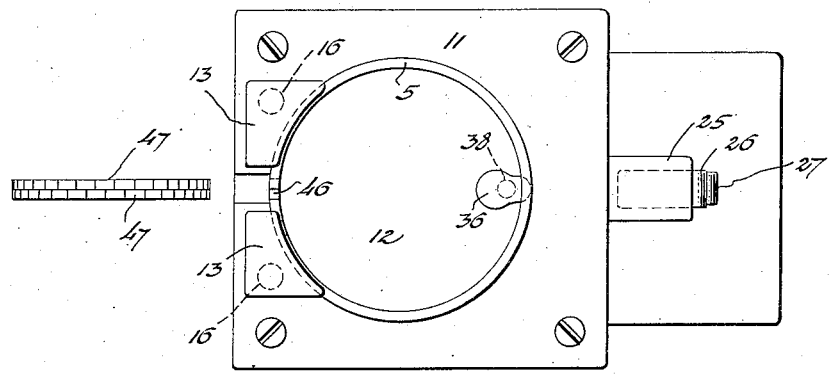
Fig. 9 is a plan of a milling machine attachment for the production of piston rings for stepped cuts.

Reference will first be had to Figs. 1 to 8 inclusive and the reference numeral 1 denotes a portion of a milling machine pedestal or body provided with ways 2 for a reciprocable carriage 3, which may be reciprocated by hand or power to and from a power driven rotary cutter 4 which is adapted to provide a piston ring 5 with an angular cut 6 so that the piston ring is split and contractible.

Adjustably mounted on the carriage 3 and fixed thereto by nut equipped bolts 7 or other clamping means are the side ears or flanges 8 of an angularly disposed work holder 9 and attached to the inclined face of said work holder, by screws 10 or other fastening means, is a detachable ring plate 11 provided with an annular recess or seat 12 to receive the ring 5, said ring fitting against the annular wall of the recess, as best shown in Fig. 3.

Overlying the marginal wall of the recess 12, at one side of the ring plate 11 are clamping jaws 13 disposed in spaced relation and provided with angular faces 14 to afford clearance for the cutter 4 when the carriage 3 is shifted to and from said cutter. The ring plate 11 has an angularly disposed slot 15, see Fig. 5, which also provides clearance for the rotary cutter 4.

The clamping jaws 13 are mounted on rods 16 extending through openings 17 provided therefor in the ring plate 11 and the work holder 9, said rods also extending through bosses 18 on the lower inclined face of the work holder. The lower ends of the rods 16 are provided with a cross head 20 held in place by nuts 19, said cross head having its ends connected to the boss 18 by coiled retractile springs 21 with the retractile force of said springs at all times tending to raise the rods 16 and the clamping jaws 13 carried thereby.

The rear inclined face of the work holder 9 is provided with a bifurcated bearing 22 and pivotally mounted in said bearing, by a transverse pin 23, is a lever 24 provided with a head 25 normally engaging the cross head 20. The long end of said lever is forked or bifurcated, as at 25, and provided with an anti-frictional roller 26, normally engaged by a cam 27 pivotally mounted, as at 28, on the rear face of a bracket 29 attached to the side of the work holder 9 by screw bolts 30, or other fastening means. The cam 27 has a peak 31, a valley 32, and a slot 33, the latter adapted to receive a stationary pin 34 carried by an arm 35 extending rearwardly from the pedestal or body 1 of the milling machine.

The ring plate 11, adjacent the marginal wall of the recess 12, is provided with an ejector comprising a head 36 normally seated in the pocket 37 provided therefor in the bottom of the recess 12, said head being mounted on a pin 38 slidable in the ring plate 11 and the work holder 9. The head 36 is preferably detachable, as shown in Fig. 6, and is of such configuration that rings of various sizes, placed in the recess 12, will overlie the counter-sunk head. On the inner end of the rod 38 is a beveled tooth 39 slidable in a socket 40 in the lower face of a workholder 9 and in said socket is a coiled expansion spring 41ª bearing against the tooth 39 and holding the head 36 normally in the pocket 37. The beveled tooth 39 protrudes from the lower face of the work holder 9 and is adapted to be engaged, as best shown in Figs. 4, 7 and 8, by a tiltable cam 41 mounted on a pin 42 journaled in the upper recessed end of a bracket 43 attached to the arm 35. The pin 42 is journaled in the bracket 43 so that it may turn or rock therein, but said pin is normally held, with the tiltable cam in an upright position, by the retractile force of a bowed spring 44 having one end thereof mounted in the pin 42 and the opposite end thereof attached to the bracket 43, as best shown in Fig. 4. The tiltable cam 41 is adapted to be engaged by the beveled tooth 39, when the carriage 3 recedes or moves away from the rotary cutter, to cause the ejector to be distended and the piston ring 5 unseated or flipped from the ring plate 11. When the carriage 3 moves towards the rotary cutter 4 the cam 41 is tilted as shown in Fig. 8 to permit the beveled tooth 39 to pass by the bracket without the ejector being actuated.

When the carriage 3 is in a retracted position relative to the rotary cutter 4 the clamping jaws 13 are in an elevated position and the ejector is retracted with the roller 26 of the lever 24 resting in the valley 32 of the cam 27 and the slot 33 of said cam engaging the stationary pin 34, all of which is shown in Fig. 4. The ring plate 11 is in condition to receive an uncut piston ring and assuming that the ring is placed in the recess 12, the operator of the machine places the carriage 3 in motion and as before stated the tiltable cam 41 permits the ejector to ride past the bracket 43 without being actuated on the inward movement of the carriage. As the carriage continues to move and bring the piston ring 5 into engagement with the rotary cutter 4, the cam 27 is turned on its pivot because of its engagement with the stationary pin 34. Since this pin causes the cam 27 to be turned on its pivot the peak 31 of said cam is brought into the engagement with the roller 26, the lever 24 rocked, the cross head 20 depressed against the action of the springs 21, and the rods 16 shifted to cause the clamping members 13 thereof to engage the upper face of the ring 5 and clamp it in the recess 12, said ring being firmly held during the cutting or slotting operation. By reference to Fig. 6 it will be noted that the relation of the roller 26, cam 27 and pin 34 is such that the cam may be considered as being on a dead center and even though said cam is moved away from the pin 34 it still holds the lever 24 in its rocked position and consequently retains the clamping jaws 13 on the piston ring. This condition exists until the carriage starts to recede or back away from the rotary cutter, when the cam 27 is again actuated by virtue of the pin 34, the lever 24 rocked by the retractile force of the springs 21, and the clamping jaws 13 elevated to release the piston ring. It is during the backward or retracting movement of the carriage that the beveled tooth 39 of the ejector encounters the tiltable cam, which is now braced and held stationary, causing the rod 38 to be distended and the piston ejected from the recess 12 by the head 36.

Figure 10:
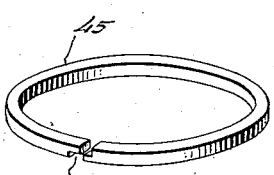
Fig. 10 is a perspective view of a piston ring having a stepped cut.
Figure 11:
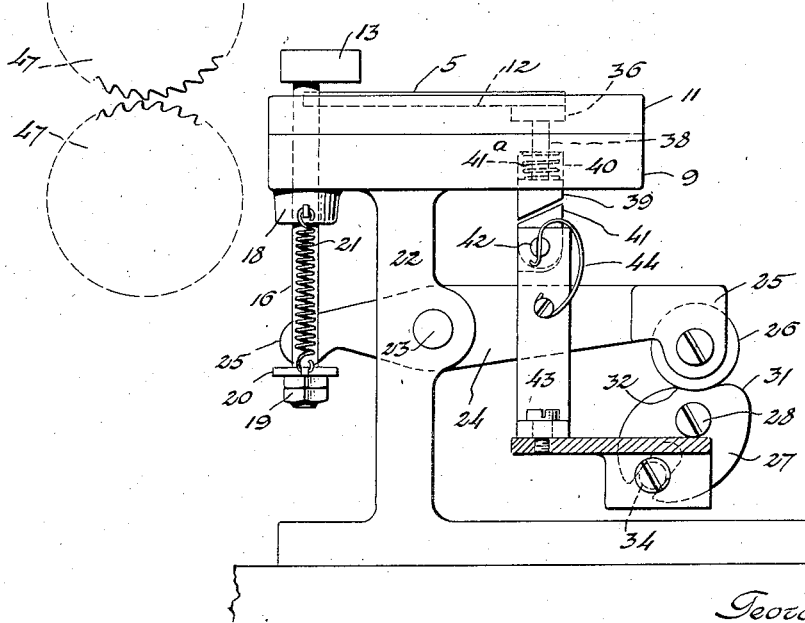
Fig. 11 is a side elevation of the attachment shown in Fig. 9.

The above briefly outlines the preferred construction and operation of my attachment for angularly slotting piston rings, and when the attachment is to be used for providing a piston ring 45 with a stepped cut 46 the attachment assumes a horizontal position, at a right angle to the plane of the rotary cutter 4, and instead of using a single cutter, I use two cutters 47, one above the other so that the upper cutter will operate upon the upper face of the piston ring and the lower cutter upon the lower face of the piston ring, the cuts so produced meeting so that the ring is severed and has confronting ends adapted to overlap when the ring is contracted. This is all brought out in Figs. 1 to 12 inclusive, and since practically the same elements are used in this form of attachment as in the angular attachment, similar reference numerals have been used to designate the elements.

As set forth in the beginning the attachment used for slotting in the finish operation may be used for rough milling, in which case a hardened ring plate 48 devoid of a ring recess and ejector, is employed and in this operation the ring is simply clamped on the hard face of the ring plate.

I attach considerable importance to the fact that it is only necessary for an operator to place a ring on the workholder and thereafter all operations are automatic, particularly the discharge of a ring after each operation. It is obvious that this will save time and labor. Furthermore, the configuration of the clamping jaws 13 is such that a ring held thereby is not scored or marred and with a clamping jaw at each side of that portion of the ring to be slotted, it is apparent that the ring is firmly held. The clamping action of the jaws is positive and reliable because of the cam and the leverage obtained in shifting the jaw rods against the action of the retractile means employed for placing the jaws in an open position. The work placed upon the reciprocatory carriage is only momentary for the reason that after the cam leaves a stationary pin the clamping means in its closed position, is set and independent of the stationary pin, and it is again obvious that the contour of the cam may be changed so as to actuate the clamping mechanism at a predetermined time relative to the movement of the reciprocable carriage. It is in this connection that the position of the bracket 43 may be changed so as to effect ejection of the piston ring when the movable carriage reaches a predetermined position.

Broadly, my invention is not limited to the slotting of piston rings because the workholder can be changed, also the clamping means, for holding various pieces of work relative to a cutting instrumentality, therefore it is to be understood that the construction herein described is susceptible to such changes as are permissible by the appended claims.

What I claim is:—

1. A milling machine attachment comprising a reciprocable work holder adapted to support a piece of work, clamping means for the piece of work actuated in timed relation to the reciprocation of said work holder, and ejecting means actuated in timed relation to the movement of said work holder.

2. A milling machine attachment as called for in claim 1, and a plate on said work holder having a recess to receive the piece of work, with a portion of said ejector means in the recess of said plate.

3. A milling machine attachment as called for in claim 1, and a plate on said work holder having a recess to receive the piece of work, with a portion of said clamping means overlying the recess of said plate and adapted to retain a piece of work in the recess of said plate.

4. A milling machine attachment as called for in claim 1, wherein said clamping means includes jaws movable relative to the work holder, retractile means for moving the jaws away from the work holder, and a lever controlling the operation of said retractile means and adapted to move said jaws towards said work holder.

5. A milling machine attachment as called for in claim 1, wherein said ejector means includes a normally retracted head, and a tiltable cam adapted to distend said head when said work holder is reciprocated in one direction relative to said cam, said cam tilting without distending said head when said work holder is reciprocated in an opposite direction.

6. The combination of a movable work holder, clamping means carried by said movable work holder, and adapted for holding a piece of work on said holder, said clamping means including a spring opened jaw, a lever adapted to close the jaw, a cam for actuating said lever, and stationary means adapted to be engaged by said cam to cause actuation thereof.

7. The combination called for in claim 6, wherein said cam has a slot and said stationary means includes a pin adapted to enter the slot of said cam.

8. The combination of a movable work holder, engageable and disengageable work clamping means carried by said movable work holder, said clamping means including a lever set by movement of said work holder in one direction to hold said clamping means in engagement with a piece of work, said lever being released by movement of said work holder in an opposite direction, and means independent of said lever adapted to disengage said clamping means from the piece of work.

9. The combination of a movable work holder, engageable and disengageable work clamping means carried by said movable work holder, said clamping means including a cam carried by said work holder for controlling the adjustment of said clamping means, and stationary means adapted to be engaged by said cam to cause said cam to engage said clamping means with a piece of work when said work holder is moved in one direction, and means adapted to disengage said clamping means, said means becoming active by movement of said work holder in an opposite direction and engagement of said cam with said stationary means.

In testimony whereof I affix my signature in presence of two witnesses.

GEORGE W. OLSON.

Witnesses:
E. I. OLSON,
H. J. WOODROW.